(12) United States Patent
Hoeftberger et al.

(10) Patent No.: US 9,955,779 B2
(45) Date of Patent: May 1, 2018

(54) FOLDING TABLE

(71) Applicant: FACC AG, Ried im Innkreis (AT)

(72) Inventors: Matthaeus Hoeftberger, Haag am Hausruck (AT); Gerhard Berger, Riedlingsdorf (AT); Wilfried Konrad, Gurten (AT)

(73) Assignee: FACC AG, Ried im Innkreis (AT)

( * ) Notice: Subject to any disclaimer, the term of this patent is extended or adjusted under 35 U.S.C. 154(b) by 0 days. days.

(21) Appl. No.: 15/526,298

(22) PCT Filed: Nov. 13, 2015

(86) PCT No.: PCT/AT2015/050291
§ 371 (c)(1),
(2) Date: May 11, 2017

(87) PCT Pub. No.: WO2016/074013
PCT Pub. Date: May 19, 2016

(65) Prior Publication Data
US 2017/0318957 A1 Nov. 9, 2017

(30) Foreign Application Priority Data
Nov. 14, 2014 (AT) .............................. A 50835/2014

(51) Int. Cl.
*A47B 23/00* (2006.01)
*A47B 5/04* (2006.01)
(Continued)

(52) U.S. Cl.
CPC ................ *A47B 5/04* (2013.01); *A47B 5/006* (2013.01); *B60N 3/004* (2013.01); *B60N 3/007* (2013.01)

(58) Field of Classification Search
CPC .......... A47B 5/04; A47B 5/006; B60N 3/004; B60N 3/007
See application file for complete search history.

(56) References Cited

U.S. PATENT DOCUMENTS 3,583,760 A * 6/1971 McGregor ............. A47B 5/006
297/145
6,520,091 B1 * 2/2003 Dettmers ............... A47B 5/006
108/42
(Continued)

FOREIGN PATENT DOCUMENTS

CN 203472620 U 3/2014
DE 1909998 A1 9/1969
(Continued)

OTHER PUBLICATIONS

ISA European Patent Office, International Search Report Issued in Application No. PCT/AT2015/050291, dated Mar. 16, 2016, WIPO, 5 pages.
(Continued)

*Primary Examiner* — Hanh V Tran
(74) *Attorney, Agent, or Firm* — McCoy Russell LLP

(57) ABSTRACT

Folding table, in particular for an aircraft, with a frame preferably to be installed in an armrest or in a side-panelling in the aircraft, with a support device for a table top, with a displacement device for displacing the support device along the frame from a stowed position to a deployed position, with a folding device for folding a support element of the support device from the deployed position to a use position, and with a drive device for assisting the displacement device in displacing the support device from the stowed position to the deployed position, wherein the drive device comprises a linear drive element which is connected to the displacement device via a cable pull device.

17 Claims, 11 Drawing Sheets

(51) Int. Cl.
*A47B 5/00* (2006.01)
*B60N 3/00* (2006.01)

(56) References Cited

U.S. PATENT DOCUMENTS

| | | | | |
|---|---|---|---|---|
| 7,721,657 | B2* | 5/2010 | Carstensen | A47B 5/006 108/134 |
| 7,963,231 | B2* | 6/2011 | Osborne | A47B 5/006 108/40 |
| 8,695,513 | B2* | 4/2014 | Figueras Mitjans | A47B 5/006 108/115 |
| 9,481,464 | B2* | 11/2016 | Gow | B64D 11/0605 |
| 9,731,829 | B2* | 8/2017 | Gow | B64D 11/0638 |
| 2003/0188672 | A1* | 10/2003 | Parent | A47B 5/006 108/134 |
| 2010/0171350 | A1* | 7/2010 | Large | B60N 3/002 297/217.3 |
| 2010/0326331 | A1* | 12/2010 | St. Louis | B64D 11/00 108/44 |

FOREIGN PATENT DOCUMENTS

| | | |
|---|---|---|
| DE | 3624156 C1 | 11/1987 |
| DE | 19935762 A1 | 2/2001 |
| EP | 1836927 A1 | 9/2007 |
| WO | 2008141829 A1 | 11/2008 |

OTHER PUBLICATIONS

International Bureau of WIPO, International Preliminary Report on Patentability Issued in Application No. PCT/AT2015/050291, dated May 26, 2017, WIPO, 6 pages.

\* cited by examiner

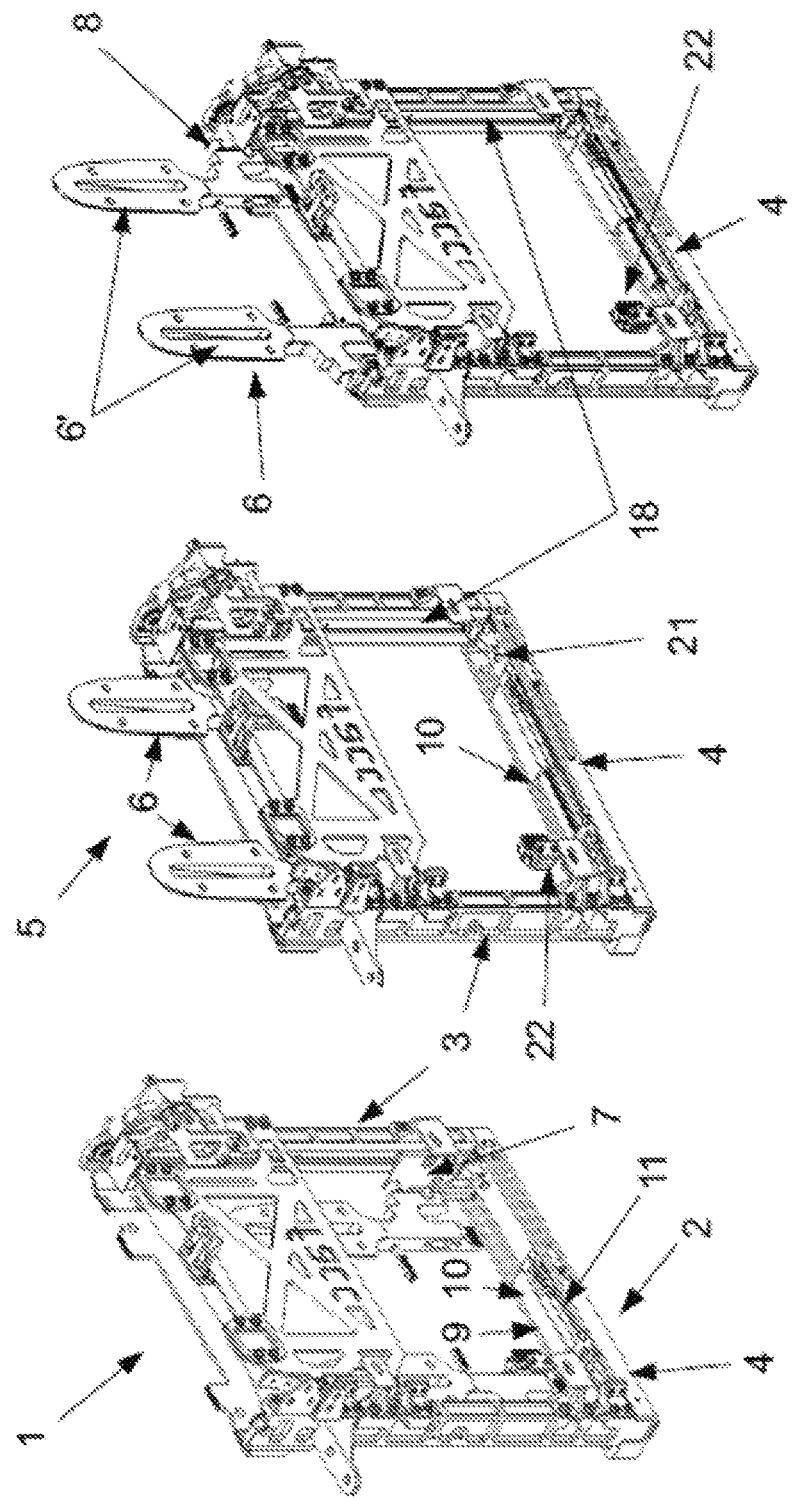

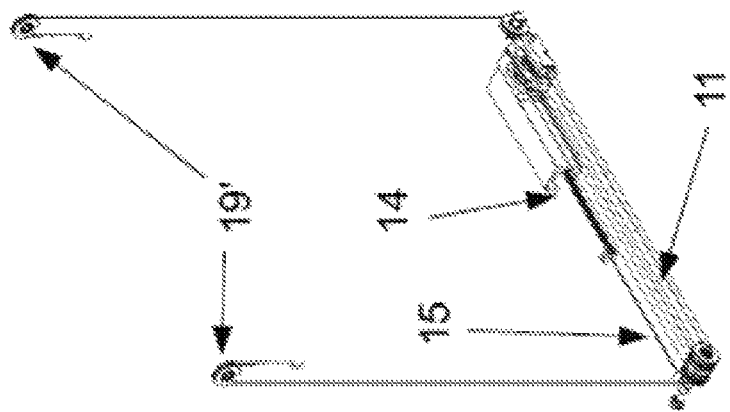
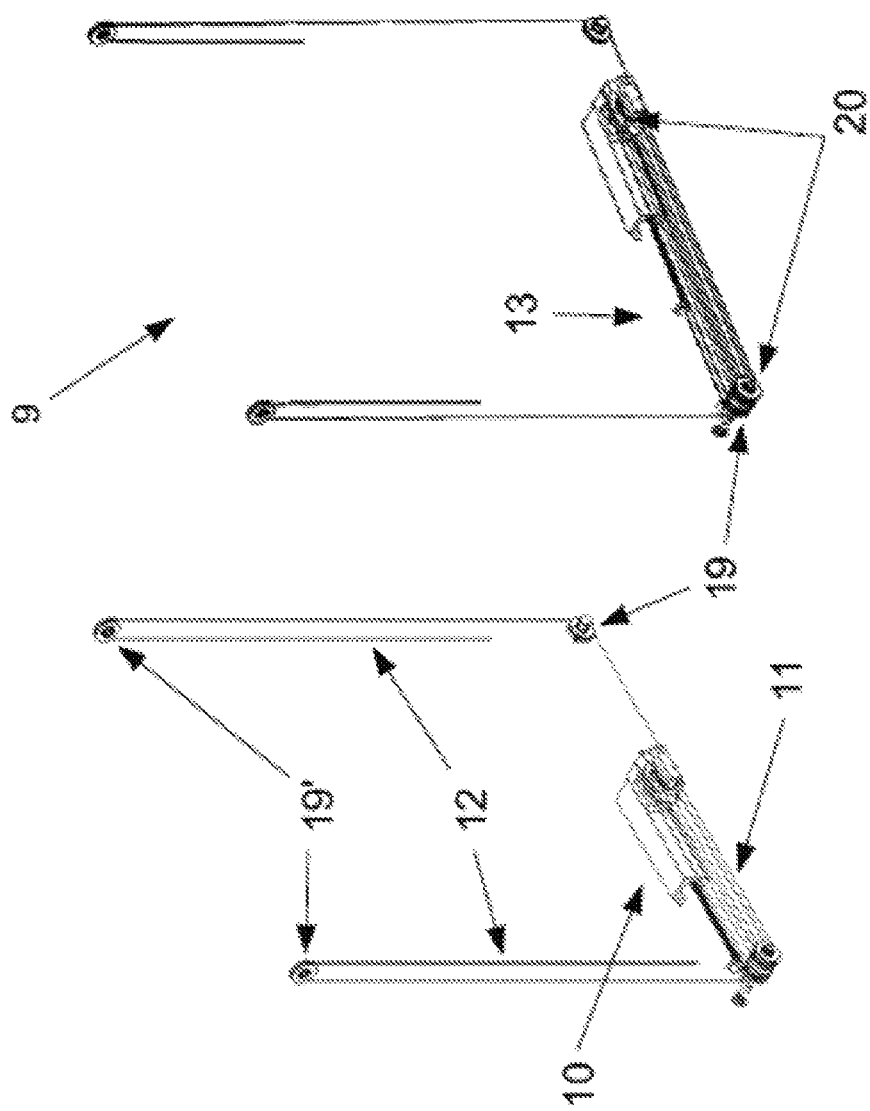
Fig. 3C
Fig. 3B
Fig. 3A

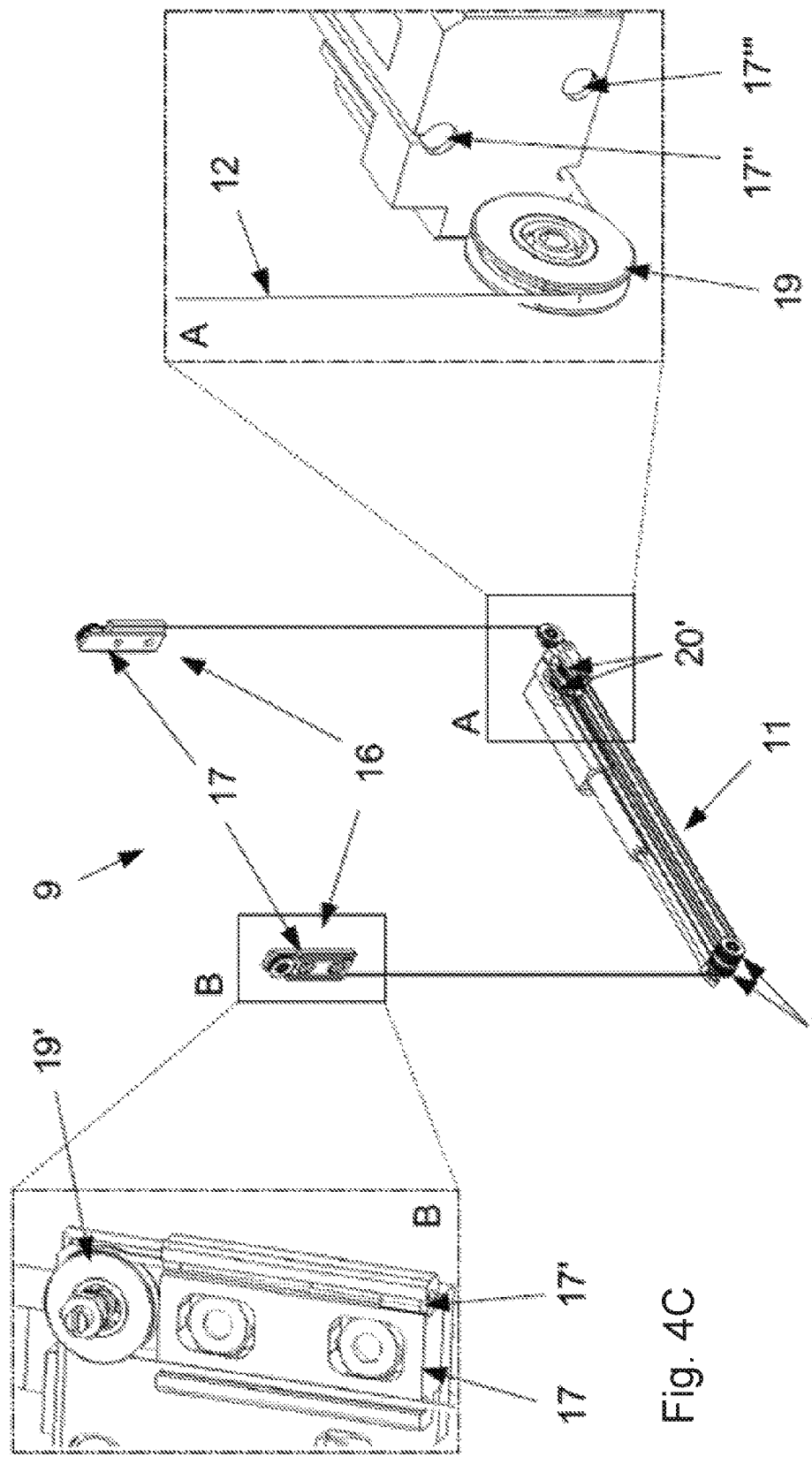

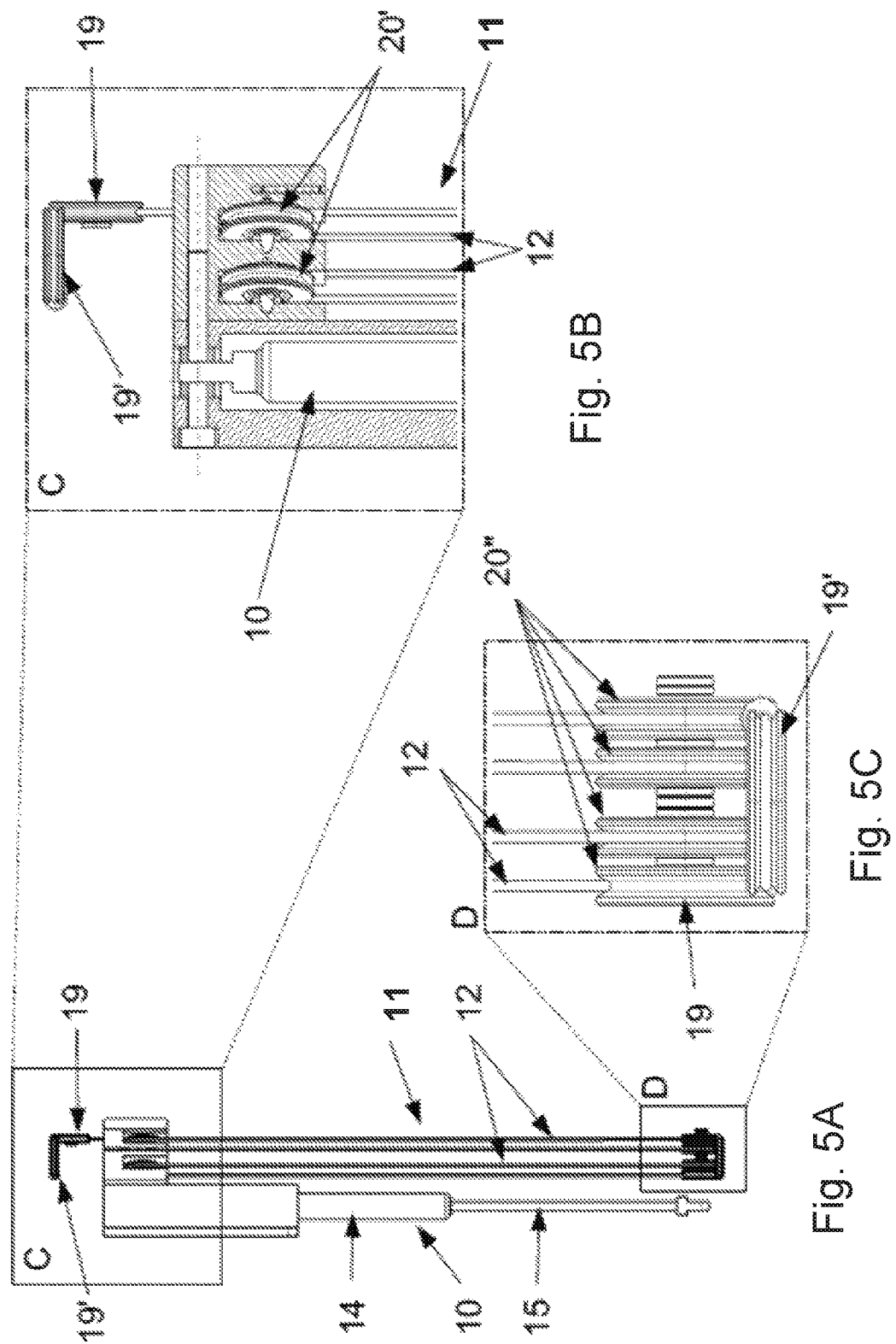

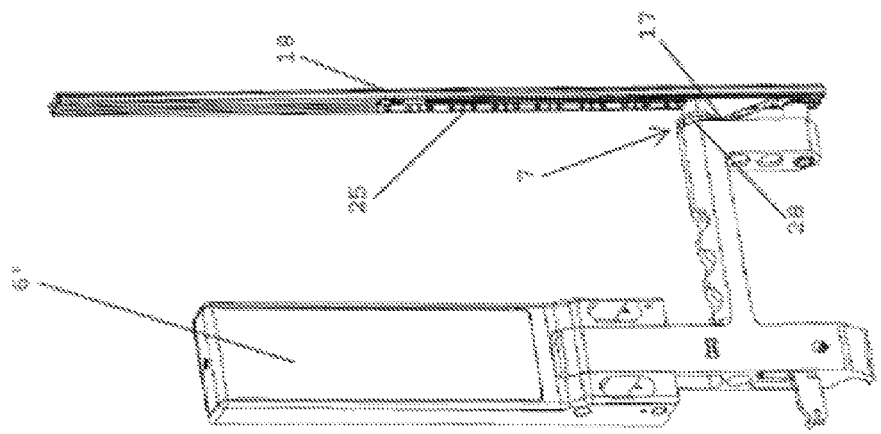
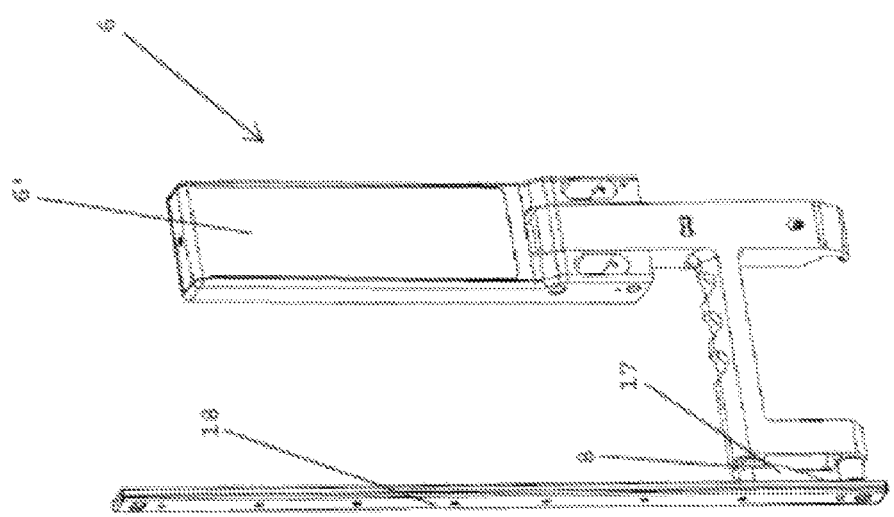
Fig. 6A

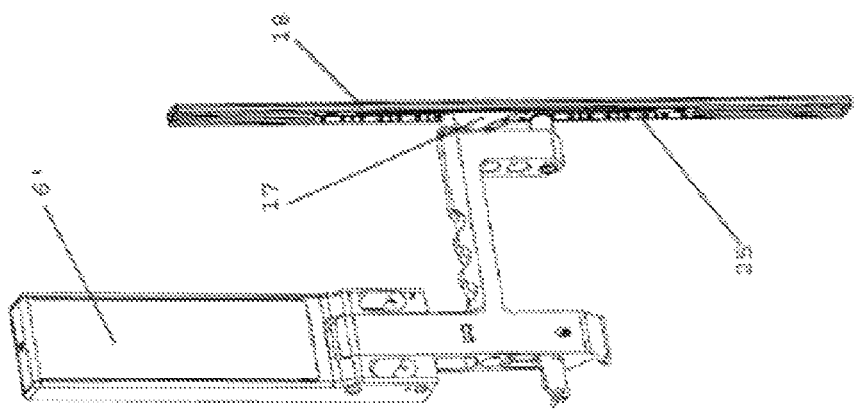
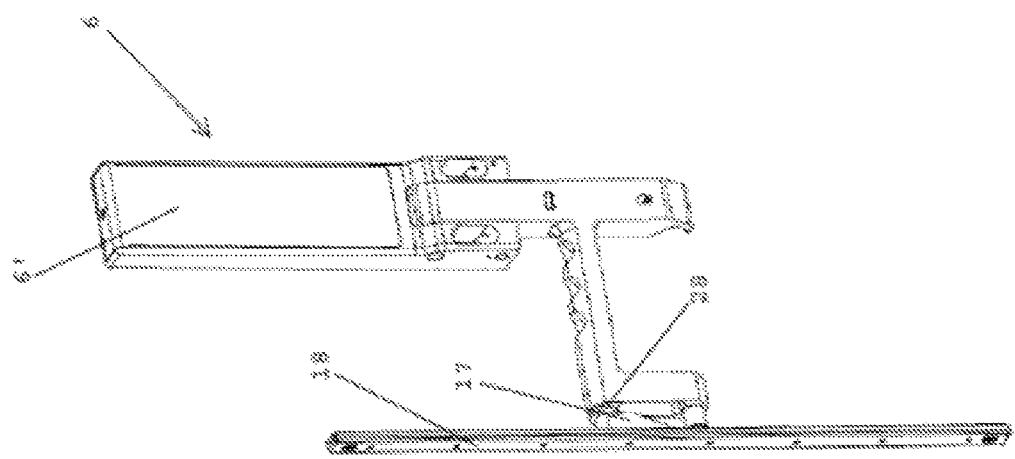
Fig. 6B

FOLDING TABLE

CROSS-REFERENCE TO RELATED APPLICATIONS

The present application is a U.S. National Phase of International Patent Application Serial No. PCT/AT2015/050291, entitled "FOLDING TABLE," filed on Nov. 13, 2015. International Patent Application Serial No. PCT/AT2015/050291 claims priority to Austrian Patent Application No. A 50835/2014, filed on Nov. 14, 2014. The entire contents of each of the above-cited applications are hereby incorporated by reference for all purposes.

TECHNICAL FIELD

The invention relates to a folding table, in particular for an aircraft, with a frame preferably to be installed in a side-panelling in the aircraft, with a support device for a table top, with a displacement device for moving (displacing) the support device along the frame from a stowed position to a deployed position, with a folding device for folding a support element of the support device from the deployed position to a use position, and with a drive device for assisting the displacement device in moving (displacing) the support device from the stowed position to the deployed position.

BACKGROUND AND SUMMARY

From the EP 1 863 927 A1 a swivel table is known, having a lower housing and a table top. The table can be moved from a stowed position, in which the table top is disposed substantially vertically in the lower housing into a use position, in which the table top is disposed substantially horizontally above the lower housing and is supported by this. Pulling the table construction out of the lower housing is assisted by springs (not shown).

In particular, what is disadvantageous in the known embodiments of folding tables for aircraft is that the assistance of the deploying motion is solved insufficiently.

In the prior art (cf. e.g. DE 19 09 998), in particular a rack-and-pinion gear is proposed, by means of which lifting of the table top on opposite sides is performed in a synchronized manner. The rack-and-pinion gear interacts with a spring, assisting the deployment of the table top. Said drive mechanism, however, has a number of disadvantages. First of all, the known design requires much space, which runs counter to the effort made by the manufacturer in achieving the largest possible space for passengers. Another disadvantage is the comparatively high weight of the rack and pinion gear. On the other hand, in the aircraft industry various efforts are being made to reduce the weight of the assembled components to the effect of reducing the fuel required. In addition, the noise generation when deploying the table was found to be disturbing at times. Furthermore, in the prior art power assistance during the deploying process is not uniform for the entire deploying process.

In addition, in the prior art other embodiments of adjustable tables are known.

The DE 199 35 762 A1 describes a retractable and extendable link plate for cantilever supports. Due to the positive and non-positive connections of the individual segments the link plate is extendable at any given angle. The risk of injury of the user due to abrupt collapse is to be prevented. For extending the link plate a drive is provided which is connected to a spindle via driving wheels and a driving belt, with which spindle a strut and tie bar is actuated. In addition, a cable pull is provided, however, which is designed for tightening the links only.

The US 2010/171350 A1 describes a seat with a pivoting display screen which can be stowed on the side of the seat by means of a rail. The displacement mechanism comprises driving rollers. In addition, a cable pull is provided as part of a dampening device.

The WO 2008/141829 A1 relates to a table apparatus for a vehicle seat, the table apparatus comprising a support mechanism and at least a table top. When not in use, the table apparatus can be stowed essentially horizontally via a rod arrangement.

Accordingly, the invention is based on the object to reduce or obviate the disadvantages of the prior art. Therefore, in particular, the object of the invention is to improve the folding table of the above stated type by means of constructionally simple means to the effect that the space required for the displacement and folding mechanism is reduced and at the same time a reduction in weight is achieved, in which connection noise generation is reduced and the deploying process is to be supported in an easy, uniform and reliable manner.

Said object is solved by a folding table having the features of claim 1. Preferred embodiments are given in the dependent claims.

According to the invention, the drive device comprises a linear drive element which is connected to the displacement device via a cable pull device.

Accordingly, the force transmission between the linear drive element and the displacement device for the support device is effected by means of a cable pull device. The cable pull device comprises at least a traction cable, which on the one side is connected to the linear drive element and on the other side is connected to the displacement device. By actuating the linear drive element a tensile force is applied onto the displacement device via the cable pull device, by means of which the displacement device is displaced together with the support device for the table top to the deployed position. Then, the support element can be folded by means of the folding device, so that the folding table is available in the use position. The design according to the invention has a number of advantages as against the prior art. For one thing, the cable pull device can be accommodated inside the frame in a particularly space-saving manner. Another advantage is that the driving force can be deflected in a particularly simple manner by means of the traction cable, whereby the spatial conditions in the mounting space can be utilized in an optimal manner. Furthermore, the weight of the drive device can be reduced, thus achieving a reduction of the amount of fuel needed in aircrafts. In addition, it is advantageous that the driving noise can be reduced, thus giving the user a particularly high-quality impression.

To achieve a reliable, stable and low-noise design it is favorable if as a linear drive element a gas (compression) spring comprising a piston element is provided, whose forward motion is transferable onto the displacement device via the cable pull device. The construction of such gas springs is generally known in the prior art, so that this does not have to be dealt with in detail. The gas spring comprises at least a cylinder element and a piston element movable in relation thereto, whereby the piston element can be moved by the pressure of a compressed gas in the extending direction. The displacement of the piston element is transmitted onto the traction cable of the cable pull device, so that a tensile force is applied onto the displacement device. For this purpose, the free end of the piston element can be connected to the frame, whereas the cylinder element is supported movably together with the corresponding end of the traction cable. Of course, however, the cylinder element might also be connected to the frame, in this case the traction cable being coupled to the piston element. In this embodiment it is particularly advantageous that the gas spring can be arranged on the frame in a particularly space-saving manner. In addition, it is advantageous that a dampening mechanism can be integrated in a simple manner. It is particularly preferred that the gas spring is connected to a release device. By actuating the release device the piston element is extended out of the cylinder element of the gas spring. Actuation of the gas spring can be effected by means of a pressure lock ("touch latch"). In this connection, the displacement mechanism is locked upon pressing down the displacement device or the table top and unlocked again upon renewed pressing. Accordingly, the pressure lock is lockable upon moving the folding table into the stowed position by pressing down the support device or the table top. In the stowed position, the pressure lock is unlockable by a pressure on the support device or the table top, whereby the folding table can be moved into the deployed or use position with the aid of the drive device. Such pressure locks or "touch latches" are known in the prior art, however only in the case of other devices such as doors of electric appliances or furniture. In the deploying process the linear forward motion of the piston element is transferred onto the one end of the cable pull, which lifts the displacement device for the table top with the other end. After end of use, the support device with the table top is folded up and moved to the stowed position, whereby the gas spring is compressed with the aid of the dead weight of the table top as well as the support, folding and displacement devices.

To move the support device for the table top along a given track between the stowed position and the deployed position, it is favorable if the displacement device each comprises a guide device on opposite sides of the frame, whereby the guide devices are each connected to a traction cable of the cable pull device. Due to the arrangement of the guide devices on opposite sides of the frame the support device for the table top is held and guided on both sides, whereby the deployment movement is effected in a particularly reliable and easy manner. Preferably, the drive device comprises exactly one linear drive element, in particular exactly one gas spring, which is coupled to exactly two cable pulls for the opposite guide devices. The two cable pulls are preferably arranged such that the forward motion of the linear drive element is converted into identical displacements of the displacement devices on the opposite sides of the frame. For this purpose, on the one hand, the cable pull device can comprise rolls movable with the linear drive element and, on the other hand, rolls arranged immovably on the frame, whereby the cable pulls are each guided over a roll movable with the linear drive element and the roll arranged immovably on the frame.

To displace the displacement device in a reliable and low-noise manner between the stowed position and the deployed position, in a preferred variant of embodiment it is advantageous if the guide devices each comprise a guide carriage, which is movable in a corresponding guiding groove. The cable pulls of the cable pull device interact with the guide carriages arranged at opposite sides of the frame, on which guide carriages the support device for the table top is installed.

According to a particularly preferred embodiment it is provided that the guide devices each comprise a guide rail connected to the frame and a guide carriage movable along the guide rail, whereby rolling elements are arranged between a track of the guide rail and a track of the guide carriage, which rolling elements are accommodated in recesses of a rolling element cage.

Accordingly, in this embodiment the guide rail and the guide carriage comprise tracks facing one another, that is to say rolling surfaces for a plurality of rolling elements, which are arranged relative to one another at a predetermined distance by means of the rolling element cage. When moving the support device along the frame the rolling elements roll off on the one side on the track of the stationary guide rail and on the other side on the track of the movable guide carriage. The rolling element cage is carried along in the direction of the longitudinal displacement of the guide carriage. Accordingly, a roller bearing or rolling bearing of the guide carriage is provided. Preferably, the rolling element cage comprises a plurality of recesses with rolling elements evenly spaced apart in the longitudinal direction of the rolling element cage. The embodiment according to the invention of the guide devices, in particular, has the advantage that guidance of the support device on opposite longitudinal sides of the frame may be accomplished with a particularly small play, i.e. in particular essentially free of play. Advantageously, this allows to reliably prevent that a unilateral or off-center load of the table top during the deploying or stowing process causes any undesired deadlock or canting of the guide carriage. Thus, malfunctions of the folding table can be avoided. Furthermore, wear of the folding table is reduced. Thus, the maintenance or replacement intervals can be increased, whereby the costs for the use of the folding table can be reduced. In addition, it is possible to save weight. Finally, it is advantageous that the generation of noise upon deploying or stowing the folding table can be reduced.

Due to the precise guidance of the opposite guide carriages over the rolling elements, in a particularly preferred embodiment, the guide devices are arranged relative to one another without connection on opposite sides of the frame. Here, "relative to one another without connection" means that a rigid cross connection between the opposite guide devices is missing. Of course, the exception to this is the connection of the guide devices over a table top installed on the support device, which table top may extend across the width of the frame, transversely to the direction of the longitudinal displacement. Due to the rolling bearing of the guide carriages a deadlock of the guide devices due to unilateral load can be reliably prevented, also without a rigid connection between the guide devices, in particular without a connecting rod or connecting shaft. Thus, the overall weight of the folding table can be reduced essentially.

To reliably hold the rolling elements in the desired position, it is favorable if the rolling element cage is arranged between the guide rail and the guide carriage in such a way that the rolling element cage essentially travels half the distance of the guide carriage between the stowed position and the deployed position of the support device. Preferably, the rolling element cage is arranged essentially centrally between the tracks of the guide rail and the guide carriage. Accordingly, a movement of the guide carriage by a certain distance causes a movement of the rolling element cage by essentially half the distance of the guide carriage.

To adapt the rolling element cage to the linear movement of the guide carriage it is advantageous if, as a rolling element cage, an elongated profile element having opposite flanges is provided, on which the recesses for the rolling elements are formed. Preferably, the cross-section of the profile element is essentially constant in the direction of displacement of the guide carriage. The flanges of the profile element comprise recesses in the form of perforations, wherein the rolling elements are arranged.

To facilitate rolling off of the rolling elements, it is favorable if the tracks of the guide rail and of the guide carriage are curved in an arc-shaped, in particular in a circular-arc-shaped manner with regard to their cross-section. The cross-section refers to a plane perpendicular to the longitudinal displacement of the guide carriage.

According to an especially preferred embodiment the guide carriage is connected to the support device via a hinge joint, in particular a joint pin. The longitudinal movement (displacement) of the guide carriage can be transferred to the support device by the hinge joint. In addition, the hinge joint realizes the folding device, with which the support element of the support device is foldable from the deployed position to the use position.

To support the guide carriage precisely on the guide rail it is favorable if balls are provided as rolling elements.

Regarding a space-saving, constructionally simple and reliable design it is favorable if the guide carriage comprises a mount for the traction cable, whereby the guide carriage comprising the mount for the traction cable is movable (displaceable) along a guide groove provided on the frame. In this design, for this reason, the mounts for the traction cables are integrated in the guide carriages. For example, the mounts for the traction cables on the guide carriages can be designed by cylindrical recesses, in which each a cylinder provided at the end of the respective traction cable can be arranged, so that the traction cable is fixed on the guide carriage. Preferably, the guide carriages are essentially movable in a vertical direction along the guide grooves on opposite longitudinal sides of the frame. Advantageously, it is thus possible to design the frame in a particularly narrow manner. Thus, the space required for installing the folding table, for instance, in a side-panelling or armrest the passenger seat can be reduced or a broader support device can be used, by means of which the mount of the tabletop can be designed in a particularly stable manner.

When the linear drive element is arranged in the operating position in an essentially horizontal position on a lower frame element of the frame, the frame element essentially extending in a horizontal direction, the linear drive element can be accommodated on the frame in a space-saving manner.

To lift the support device with the table top into the deployed position the guide devices are preferably arranged on lateral frame elements essentially extending in a vertical direction, whereby the forward motion of the linear drive element, in particular, in the horizontal direction can be converted, by means of deflection pulleys of the cable pull device, into corresponding essentially vertical displacements of the guide devices along the lateral frame elements of the frame. Thus the cable pull device especially offers the advantage that the feed direction of the linear drive element may be different from the direction of displacement of the displacement device. This is why the drive and displacement mechanism can be accommodated on the frame in an especially space-saving manner. Preferably, the frame comprises a lower, essentially horizontal frame element, in which the linear drive element is arranged, and two lateral, essentially vertical frame elements, on which the guide devices for the support device are supported. Accordingly, the frame is essentially U-shaped, whereby the support device with the tabletop is deployable through the upper, open-end of the frame, prior to the movable part of the support device with the tabletop being laterally foldable into the use position.

According to a particularly preferred embodiment the cable pull device comprises at least one transmission roll to obtain transmission between the forward motion of the linear drive element and the displacement of the displacements device. The transmission ratio between the displacement of the linear drive element and the displacement of the displacement device preferably is between 2 and 5, in particular essentially 3. The force to be applied onto the displacement device by the linear drive element can be reduced by the transmission of the drive movement. Furthermore, existing, standardized springs or dampening elements may be used for the linear drive element due to the variably selectable transmission. Preferably, at least one, in particular exactly one transmission roll is provided for each side of the folding table. The transmission rolls are preferably coupled to the linear drive element in order to join in its linear motion. Thereby, the cable pulls with the transmission rolls form a pulley block.

It is particularly advantageous if a dampening element for dampening the movement of the linear drive element is provided. Thus, a uniform deploying process can be achieved. For example, a dampening mechanism can be integrated in the gas spring already.

According to a preferred embodiment a dampened stop is provided between the frame and the linear drive element. In addition to the uniform deploying process, due to the dampening element the deploying position can be smoothly achieved thereby, additionally further reducing any noise generation.

BRIEF DESCRIPTION OF THE FIGURES

Below, the present invention will be described in more detail with reference to an embodiment shown in the drawing, however, to which it is not limited, in which:

FIG. 2A shows a diagrammatic view of the folding table according to FIG. 1 (without the table top) prior to assembly to the side-panelling, whereby the folding table is shown in the lower stowed position;

FIG. 2B shows a diagrammatic view of the folding table in a position deployed by 90 mm;

FIG. 2C shows a diagrammatic view of the folding table in a deployed position;

FIG. 3A shows a diagrammatic view of a drive and displacement device of the folding table according to FIGS. 1, 2A-D, which is shown in a position corresponding the stowed position of the folding table;

FIG. 3B shows a diagrammatic view of the drive and displacement device according to FIG. 3A in an intermediate position;

FIG. 3C shows a diagrammatic view of the drive and displacement device according to FIGS. 3A, 3B in a position corresponding to the deployed or use position of the folding table;

FIG. 4A shows the drive and displacement device according to FIG. 3A in the deployed position, whereby in addition guide devices can be seen on the upper ends of the cable pulls;

FIG. 4B shows the detail A of FIG. 4A in enlarged form;

FIG. 4C shows the detail B of FIG. 4A in enlarged form;

FIG. 5A shows a top view of the drive and displacement device;

FIG. 5B shows the detail C of FIG. 5A in enlarged form;

FIG. 5C shows the detail D of FIG. 5A in enlarged form;

FIG. 6A shows a diagrammatic view of an alternative embodiment of the support and displacement device of the folding table in the stowed position;

FIG. 6B shows a diagrammatic view of the support and displacement device according to FIG. 3A in an intermediate position;

DETAILED DESCRIPTION

Figure 1:
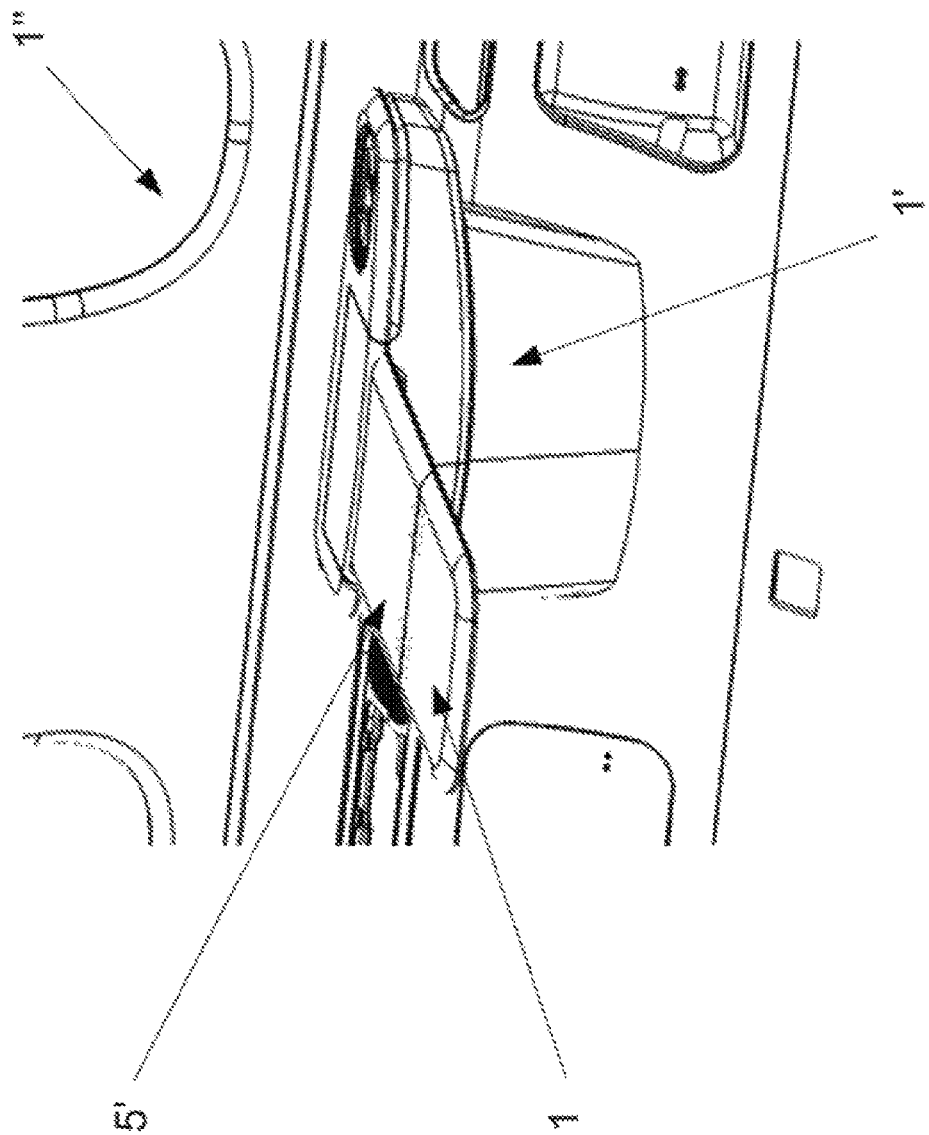
FIG. 1 shows a diagrammatic view of a section of an aircraft, whereby a folding table according to the invention in the folded-out use position can be seen in the installed state at a side-panelling of the aircraft.

FIG. 1 shows a folding table 1 which is installed in a side-panelling 1' in an aircraft 1". FIG. 1 shows the folding table 1 in a deployed use position, whereby the folding table 1 can be stowed away completely inside the side-panelling 1', as will be described in more detail below.

Figure 2D:
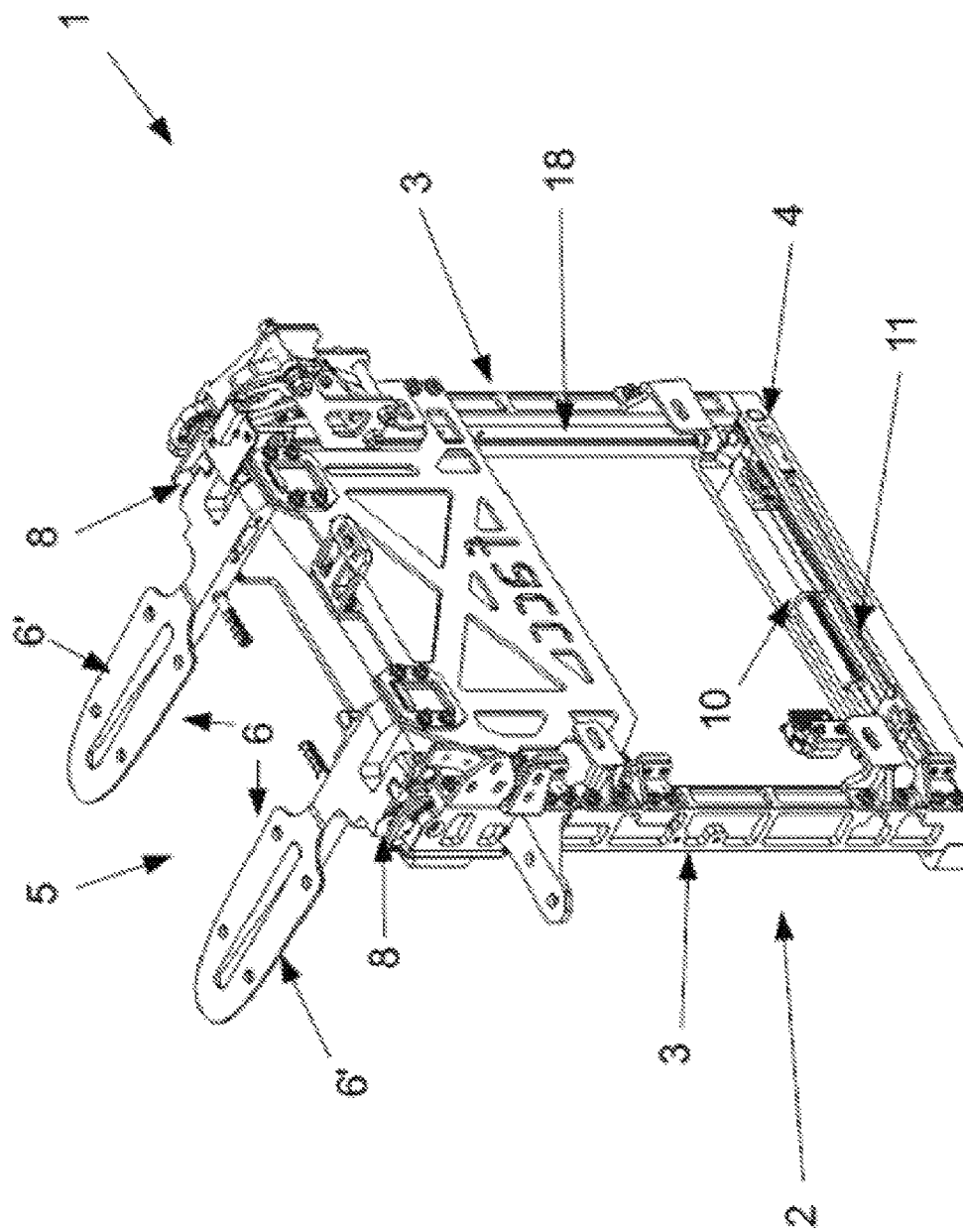
FIG. 2D shows a diagrammatic view of the folding table in the use position.
Figure 6C:
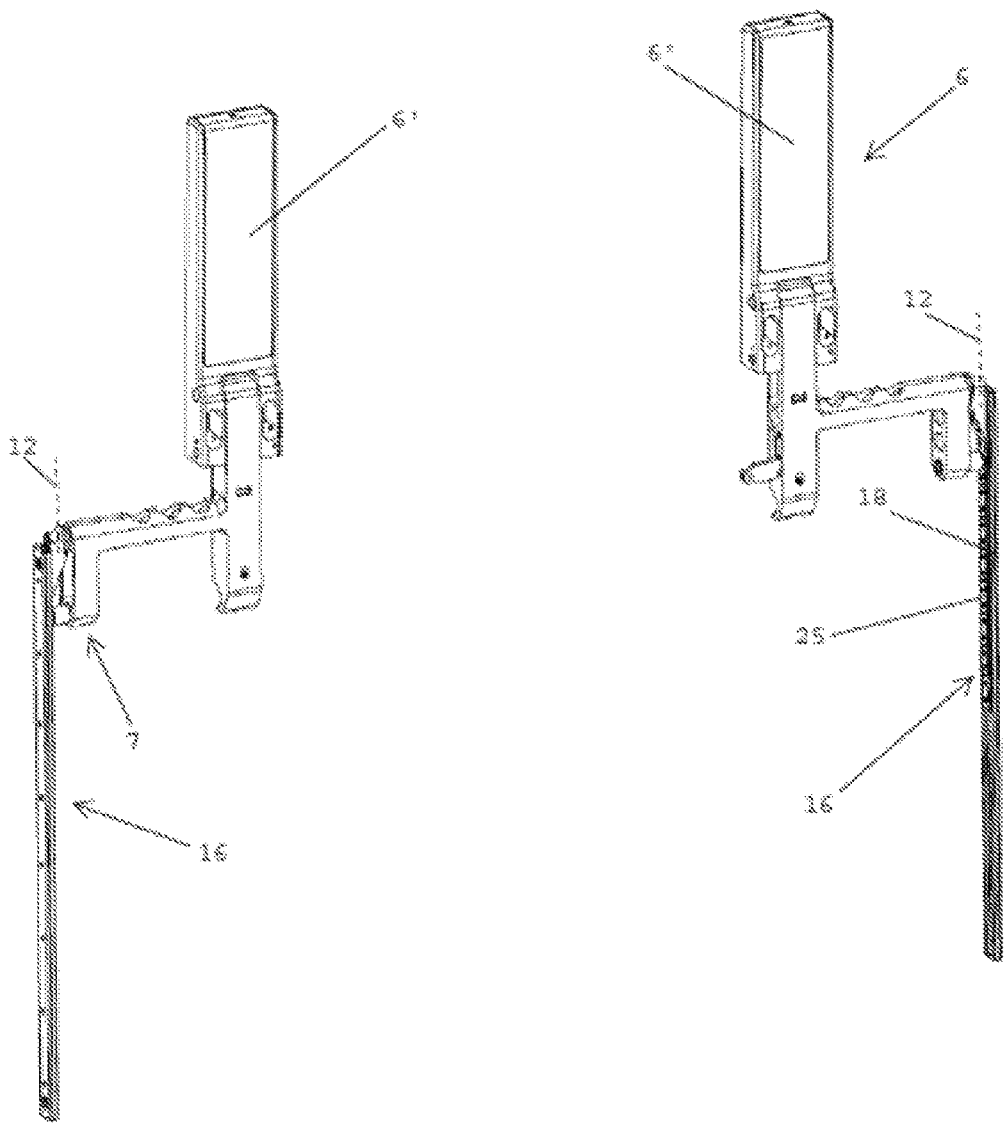
FIG. 6C shows a diagrammatic view of the support and displacement device according to FIGS. 3A, 3B in the deployed position.

As can be seen from FIG. 2A, the folding table 1 comprises an essentially U-shaped frame 2, which is installed in a housing (not shown) of the side-panelling 1'. The frame 2 is composed of two lateral frame elements 3, which, in the operating position, are arranged essentially verticality or perpendicularly to the ground surface of the aircraft, and of one lower frame element 4 connecting the lateral frame elements 3, which in the operating position is arranged essentially horizontally. The folding table 1 comprises a support device 5, on which the table top 5' shown in FIG. 1 can be installed. The support device 5 comprises a swiveling support element 6, which in the shown embodiment is formed by two support flanges 6'. The table top 5' can be fastened to the top sides of the support flanges 6'. To bring the folding table 1 from the stowed position shown in FIG. 2A into the deployed position shown in FIG. 2C, a displacement device (means) 7 for moving the support device 5 in a vertical direction along the frame 2 is provided. Furthermore, to bring the folding table 1 from the deployed position shown in FIG. 2C into the use position shown in FIG. 2D, a folding device 8 for folding the support element 6 from the deployed position into the use position is provided. The support element 6 is preferably swiveled by essentially 90°. In the simplest case, the folding means 8 is formed by a joint between the swiveling support element 6 for the table top 5' and a non-swiveling holding element of the support device 5. In the stowed position and in the deployed position, the support element 6 for the table top 5' is arranged essentially vertically, whereby the support element is blocked against folding down until having reached its final deployed position. By folding down the support element 6 the essentially horizontal use position is reached. The folding table 1 can be stowed in the side-panelling 1' in reverse order. FIG. 2B shows an intermediate position between the stowed position and the deployed position, in which the support device 5 was deployed by 90 mm.

As can be further seen from FIGS. 3A to 3C, a drive device 9 is provided for supporting the displacement device 7 upon moving (displacing) the support device 5 from the stowed position into the deployed position. This facilitates the deploying of the folding table 1. In the shown embodiment, the drive device 9 comprises a linear drive element 10, that is a drive element which is movable along a straight track and connected to the displacement device 7 via a cable pull device 11. The cable pull device 11 comprises two traction cables 12, which are designed as power transmission means between the linear drive element 10 and the displacement device 7. A tensile force can be applied in vertical direction onto the displacement device 7 by the traction cables 12, in order to lift the displacement device 7 and the support device 5 connected thereto from the stowed position, cf. FIG. 2A, into the deployed or use position, cf. FIG. 2C or 2D.

Furthermore, as can be seen from FIGS. 3A to 3C, a gas spring 13 is provided as a linear drive element 10, which conventionally comprises a piston element 15 movable relative to a cylinder element or pressure pipe 14. The forward motion of the piston element 15 of the gas spring 13 is transmitted to the displacement device 7 via the cable pull device 11, whereby it is pulled upwards together with table top 5'.

As can be seen from FIG. 4, the displacement device 7 each comprises a guide device 16 on the opposite lateral frame elements 3 of the frame 2 shown in FIGS. 2A to 2C. The guide devices 16 are each connected to one of the two traction cables 12 of the cable pull device 11, whereby the traction cables 12 are deflected by means of stationary rolls 19' by 180 degrees. Thus, the traction cables 12 are designed such that the forward motion of the linear drive element 10 causes a displacement of the guide devices 16. It is thereby ensured that the displacement takes place in a uniform manner on the left-hand side and the right-hand side. Accordingly, the deploying movement of the displacement device 7 is synchronized on the opposite sides of the frame 2.

Furthermore, as can be seen from FIGS. 4A-C, the guide devices 16 comprise guide carriages 17 which are moveably (displaceably) supported in a vertical direction in corresponding guiding grooves 18 (cf. FIG. 2B). In the shown embodiment, the guide carriages 17 each comprise a mount 17' for the one end of the traction cable 12, whereby the other ends of the traction cables 12 are coupled to the linear drive element 10. In the shown embodiment, cylindrical holding openings are provided on the guide carriage 17 as mounts 17', in which holding openings corresponding cylindrical elements that are arranged on the one ends of the traction cables 12 are clamped. The other ends of the traction cables 12 are connected on an upper mounting location 17" or on a lower mounting location 17''', which are jointly moveable with the linear drive element 10. The guide carriages 17 with the clamped ends of the traction cables 12 are displaced along the guiding grooves 18 upon being deployed, which are formed in the lateral frame elements 3 of the frame 2 (cf. FIG. 2B).

As can be further seen from FIGS. 2A to 2C, the linear drive element 10 is arranged inside the lower frame element 4 of the frame 2, which frame element 4 essentially extends in a horizontal direction. In addition, the traction cables 12 run over the 90° deflection pulleys 19 shown in FIGS. 3A to 3C, FIG. 4A on opposite ends of the lower frame element 4, so that the forward motion of the linear drive element 10 is transmitted in horizontal direction in corresponding displacements of the guide carriages 17 along the guiding grooves 18 on the lateral frame elements 3 of the frame 2.

Furthermore, as can be seen from FIGS. 5A-C, the cable pull device 11 is adapted to obtain a transmission between the forward motion of the linear drive element 10 and the displacement of the displacement device 7. For this purpose the traction cables 12 are guided between the linear drive element 10 and the guide devices 16 via transmission or deflection pulleys 20. In the shown embodiment, two transmission rolls 20' are coupled to the pressure pipe 14 of the gas spring 13, so that the transmission rolls 20' go along with the forward motion of the gas spring 13. Accordingly, exactly one transmission roll 20' is provided for each side, thus forming a pulley block. In addition, two pairs of deflection pulleys 20" are supported on the lower frame element 4, which therefore are arranged stationary, independently of the position of the gas spring 13. The outside deflection pulley 20" adjacent to the piston element 15 is at the same time designed as a 90° deflection pulley 19. The traction cables 12 each run over a transmission roll 20' coupled to the pressure pipe 14 and two deflection pulleys 20" arranged on the lower frame element 4. Thus, the same transmission is achieved for both traction cables. Furthermore, as can be seen from FIG. 5, the transmission rolls 20' are arranged at an angle with respect to a vertical plane extending in parallel to the longitudinal direction of the linear drive element 10, so that a horizontal distance is formed between the entrance and the exit of the traction cables 12 on the transmission rolls 20', which distance exactly corresponds to the axial distance present between the two deflection pulleys 20" pertinent to one traction cable 20.

Furthermore, it is shown in the drawing (cf. FIG. 2B) a pressure lock 22 ("touch latch") which can be actuated by pressing on the support device 5 or on the table top 5'. In the stowed position (cf. FIG. 2A) the pressure lock 22 can be unlocked by pressing once, whereupon the folding table 1 is deployed with the help of the linear drive element 10 until the deployed or use position has been reached. Upon stowing the folding table 1 the support device 5 is pushed into the stowed position, whereby the pressure lock 22 is locked by pressing down the support device 5 or the table top 5'.

Furthermore, as can be seen from FIG. 2B, a dampened stop 21 is additionally provided between the frame 2 and the linear drive element 10. The dampened stop 21 preferably comprises a spring or rubber element.

In the embodiment of the folding table 1 according to FIGS. 1 to 5C a plain bearing is provided between the movable guide carriage 17 (cf. FIGS. 4A-C) and the guiding groove 18 (cf. FIGS. 2B-D).

In FIGS. 6A to 6C, 7A to 7C and 8 an alternative embodiment of the displacement and support device 7, 5 is provided.

In this embodiment the guide devices 16 comprise guide carriages 17 which are supported in a displaceable manner along the guide rails 18 on the frame 2 in a vertical direction. Upon deploying or stowing the folding table 1 the guide rails 18 are arranged in a stationary manner, the guide carriages 17 are arranged movably on the frame 2 in a longitudinal direction.

Figure 7A:
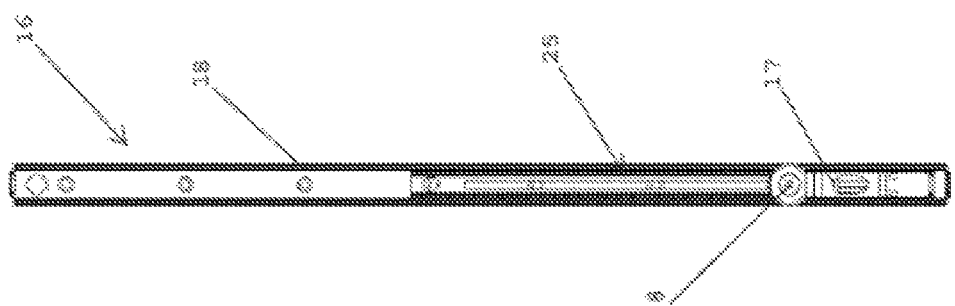
FIG. 7A shows the guide device of the embodiment according to FIGS. 6A to 6C in a position corresponding to the stowed position.
Figure 7B:
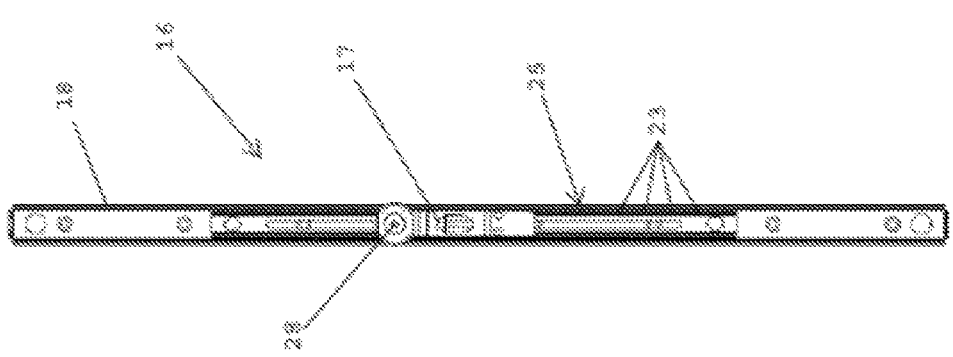
FIG. 7B shows the guide device according to FIG. 7A in an intermediate position.
Figure 7C:
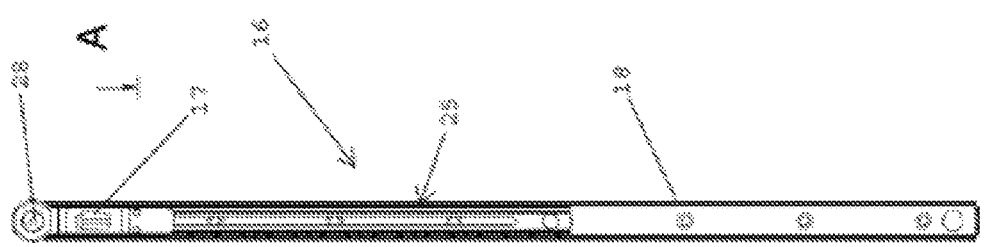
FIG. 7C shows the guide device according to FIGS. 7A, 7B in the deployed position.
Figure 8:
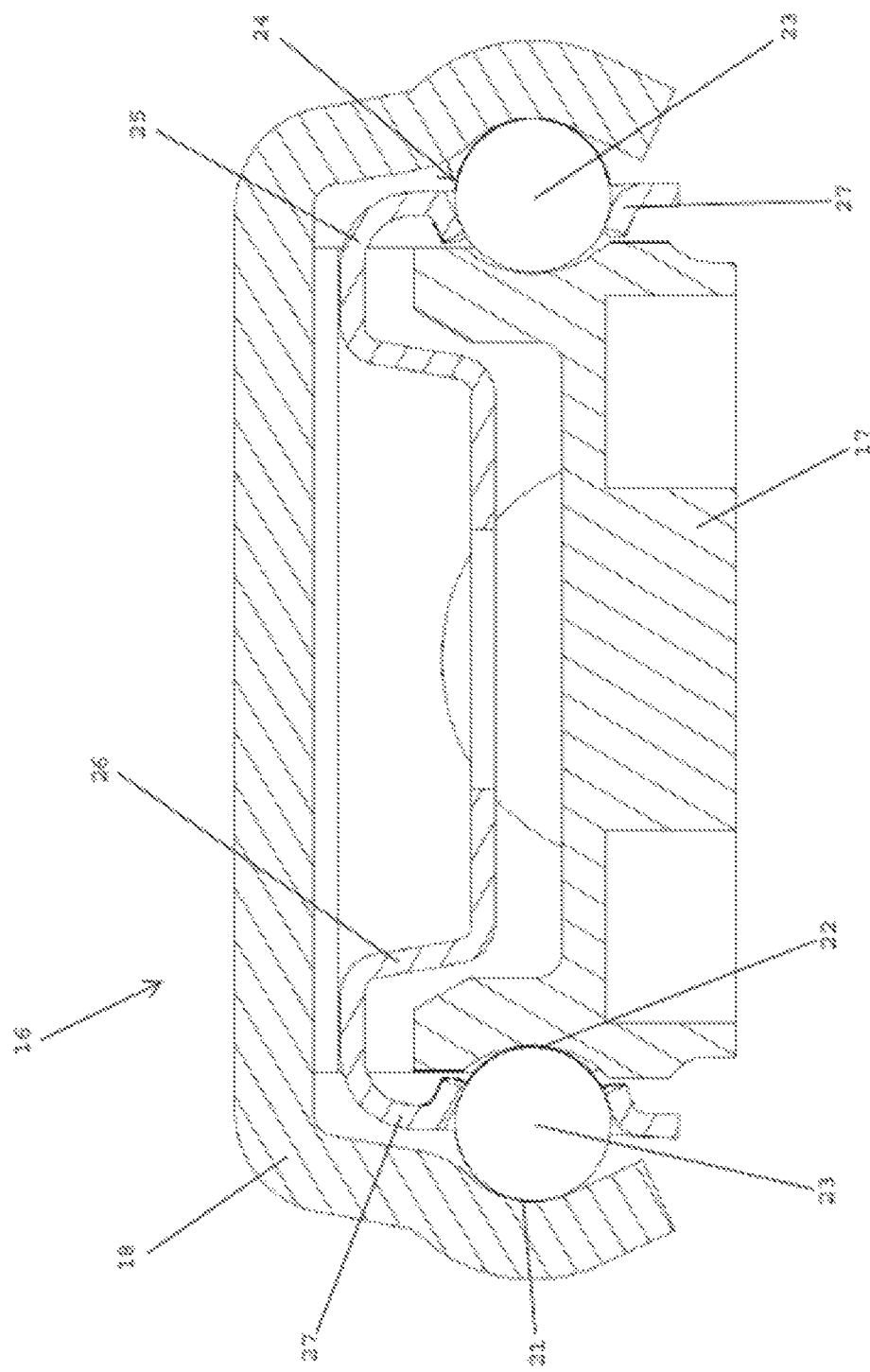
FIG. 8 is a cross-sectional view according to line A-A in FIG. 7C.

As can be seen from FIGS. 7A to 7C, in detail from FIG. 8, a plurality of rolling elements 23 is provided between a track 21 of the guide rail 18 and a track 22 of the guide carriage 17. The rolling elements 23 are held in recesses 24 of a rolling element cage 25. The recesses 24 essentially have the same diameter as the rolling elements 23. The rolling element cage 25 is arranged essentially centrally between the guide rail 18 and the guide carriage 17. In the deploying process the rolling element cage 25 essentially travels half the distance of the guide carriage 17 between the stowed position (cf. FIG. 7A) and the deployed position (cf. FIG. 7C) of the support device 5 in the same direction of movement. In the shown embodiment, balls are provided as rolling elements 23. The tracks 21, 22 of the guide rail 18 or of the guide carriage 17 are curved in a correspondingly circular-arc-shaped manner in terms of their cross-section.

Furthermore, as can be seen from FIGS. 7A to 7C and FIG. 8, as a rolling element cage 25 an elongated or oblong profile element 26 with opposite flanges 27 is provided. The recesses 24 for the rolling elements 23 are formed in the flanges 27.

Furthermore, from FIGS. 7A to 7C it can be seen that the guide carriages 17 are connected to the support element 6 of the support device 5 via joint pins 28.

The invention claimed is:

1. A folding table with a frame, with a support device for a table top, with a displacement device for displacing the support device along the frame from a stowed position to a deployed position, with a folding device for folding a support element of the support device from the deployed position to a use position, and with a drive device for assisting the displacement device in displacing the support device from the stowed position to the deployed position, wherein the drive device comprises a linear drive element which is connected to the displacement device via a cable pull device.

2. The folding table according to claim 1, wherein a gas spring comprising a piston element is provided as a linear drive element, whose forward motion is transferable via the cable pull device onto the displacement device.

3. The folding table according to claim 2, wherein the displacement device comprises each a guide device on opposite sides of the frame, whereby the guide devices are each connected to a traction cable of the cable pull device.

4. The folding table according to claim 3, wherein the guide devices each comprise a guide rail connected to the frame and a guide carriage movable along the guide rail, whereby rolling elements are arranged between a track of the guide rail and a track of the guide carriage, which are accommodated in recesses of a rolling element cage.

5. The folding table according to claim 4, wherein the guide carriage comprises a mount for the traction cable, the guide carriage having the mount for the traction cable being displaceable along a guiding groove provided on the frame.

6. The folding table according to claim 1, wherein in an operating position the linear drive element is arranged in an essentially horizontal position on a lower frame element of the frame, the frame element extending essentially in a horizontal direction.

7. The folding table according to claim 3, wherein the guide devices are arranged on lateral frame elements that essentially extend in a vertical direction, whereby the forward motion of the linear drive element is converted by means of deflection pulleys of the cable pull device into corresponding, essentially vertical shifts of the guide devices along the lateral frame elements of the frame.

8. The folding table according to claim 2, wherein the cable pull device comprises at least one transmission roll to obtain a transmission between the forward motion of the linear drive element and the displacement of the displacement device.

9. The folding table according to claim 1, wherein a damping element for damping movement of the linear drive element is provided.

10. The folding table according to claim 1, wherein a dampened stop is provided between the frame and the linear drive element.

11. The folding table according to claim 1, wherein the folding table is for an aircraft.

12. The folding table according to claim 7, wherein the forward motion of the linear drive element is in a horizontal direction.

13. The folding table according to claim 11, wherein the folding table is to be installed in an armrest or in a side-paneling in the aircraft.

14. The folding table according to claim 5, wherein in an operating position the linear drive element is arranged in an essentially horizontal position on a lower frame element of the frame, the frame element extending essentially in a horizontal direction.

15. The folding table according to claim 5, wherein the guide devices are arranged on lateral frame elements that essentially extend in a vertical direction, whereby the forward motion of the linear drive element is converted by means of deflection pulleys of the cable pull device into corresponding, essentially vertical shifts of the guide devices along the lateral frame elements of the frame.

16. The folding table according to claim 7, wherein the cable pull device comprises at least one transmission roll to obtain a transmission between the forward motion of the linear drive element and the displacement of the displacement device.

17. The folding table according to claim 9, wherein a dampened stop is provided between the frame and the linear drive element.

* * * * *